(12) United States Patent
Garza et al.

(10) Patent No.: US 9,266,426 B2
(45) Date of Patent: Feb. 23, 2016

(54) VEHICLE COMPONENT ENCLOSURE

(71) Applicant: Deere & Company, Moline, IL (US)

(72) Inventors: Emmanuel Alejandro Garza, Saltillo (MX); Pedro C. Gonzalez, Moline, IL (US); Guillermo Pamanes, Coahuila (MX)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/551,217

(22) Filed: Nov. 24, 2014

(65) Prior Publication Data

US 2015/0144415 A1 May 28, 2015

(30) Foreign Application Priority Data

Nov. 25, 2013 (DE) .......................... 10 2013 224 002

(51) Int. Cl.
| | |
|---|---|
| *B60K 13/04* | (2006.01) |
| *B60R 3/02* | (2006.01) |
| *F01N 3/10* | (2006.01) |
| *B62D 25/24* | (2006.01) |
| *F01N 13/18* | (2010.01) |

(52) U.S. Cl.
CPC . *B60K 13/04* (2013.01); *B60R 3/02* (2013.01); *B62D 25/24* (2013.01); *F01N 3/10* (2013.01); *F01N 13/1805* (2013.01); *F01N 2590/08* (2013.01)

(58) Field of Classification Search
CPC ........ B60K 13/04; B60K 13/02; B60D 49/00; B60D 49/0607; F02M 35/162
USPC .......................................................... 180/309
See application file for complete search history.

(56) References Cited

U.S. PATENT DOCUMENTS

| | | | | |
|---|---|---|---|---|
| 3,933,216 A | * | 1/1976 | Irwin ............................ | 180/309 |
| 4,074,786 A | * | 2/1978 | Joubert ........................ | 180/68.5 |

* cited by examiner

*Primary Examiner* — John Walters
*Assistant Examiner* — James Triggs

(57) ABSTRACT

The invention concerns a component enclosure for an agricultural work vehicle having a combustion engine, an exhaust gas aftertreatment device for discharging and aftertreatment of the exhaust gas, a driver's cabin, and an access facility to access the driver's cabin. The access facility forms an enclosure for a component of the exhaust gas aftertreatment device.

18 Claims, 3 Drawing Sheets

VEHICLE COMPONENT ENCLOSURE

TECHNICAL FIELD

The present disclosure relates to an agricultural work vehicle with a structure for enclosing a component of an exhaust gas aftertreatment device.

BACKGROUND

Currently available agricultural work machines, such as for example, tractors, combine harvesters, or also construction machines, must increasingly comply with strict exhaust gas norms, or will have to comply with them in the future. The result of this is that the exhaust gas aftertreatment devices to be installed are increasingly complex and, furthermore, require a larger space in and on the vehicle. Therefore, for example, soot particle filters, alone or in combination with NOx-reducing catalysts, are installed as components of these exhaust gas aftertreatment devices. At least one of these components is often positioned laterally on the machine before the A-pillar of the cabin. Here, problems may arise with regard to the installation space, since the front fenders, the access steps to the cabin, or the holders of a front loader are likewise situated in this area. Also, the result may be a restriction of the field of vision of the operator of the work machine. In particular, problems with heat radiation in the direction of the operator of the machine are possible with so-called open drivers' cabins. Thus, it is desired to provide an optimized enclosure and location of a component of an exhaust gas aftertreatment device.

SUMMARY

According to an aspect of the present disclosure, an agricultural work vehicle has a combustion engine to drive the work vehicle, an exhaust gas aftertreatment device for discharging and aftertreatment of the exhaust gas, a driver's cabin for an operator to drive and operate the work vehicle, and an access facility to access the driver's cabin. The access facility forms an enclosure of at least one component of the exhaust gas aftertreatment device.

Due to the integration of at least one component of the exhaust gas aftertreatment device with the access facility, there is, in accordance with the invention, a low arrangement or fastening position in the vertical direction. In this way, the available space in the lateral lower area next to the driver's cabin, which can be a closed cabin or an open driver's cabin, is optimally utilized. In accordance with the invention, the installation space problems addressed above are solved and, in particular, the visibility conditions for the operator are improved.

Preferably, the access facility has at least one step to access the driver's cabin. In this way, an operator can easily gain access to the driver's cabin. In particular, provision can be made so that the at least one step can move between a folded-in and a folded-out position. This ensures that the at least one step does not stick out laterally during the operation of the work machine and cannot touch the surrounding areas.

Preferably, the at least one component of the exhaust gas aftertreatment device is a NOx-reducing catalyst. In particular with an exhaust gas aftertreatment device that comprises a soot particle filter and a NOx-reducing catalyst and in which the soot particle filter is regularly kept close to the engine and the hood, an installation space-optimized arrangement outside the engine space is also guaranteed.

Preferably, the at least one component of the exhaust gas treatment device is supported, at least indirectly, above the access facility on a frame structure element of the work vehicle. In this way, only one connecting point need be provided on the vehicle frame or the engine gear unit for the integrated arrangement, consisting of the component and the access facility.

Preferably, the access facility is supported above a holding arm on a frame element of the work vehicle. In this way, only one connecting element to the vehicle frame need be made available.

Preferably, the holding arm is a casting. This is simple to produce and offers a sufficient strength for the component that is to be supported.

DETAILED DESCRIPTION OF THE DRAWINGS

Figure 1:
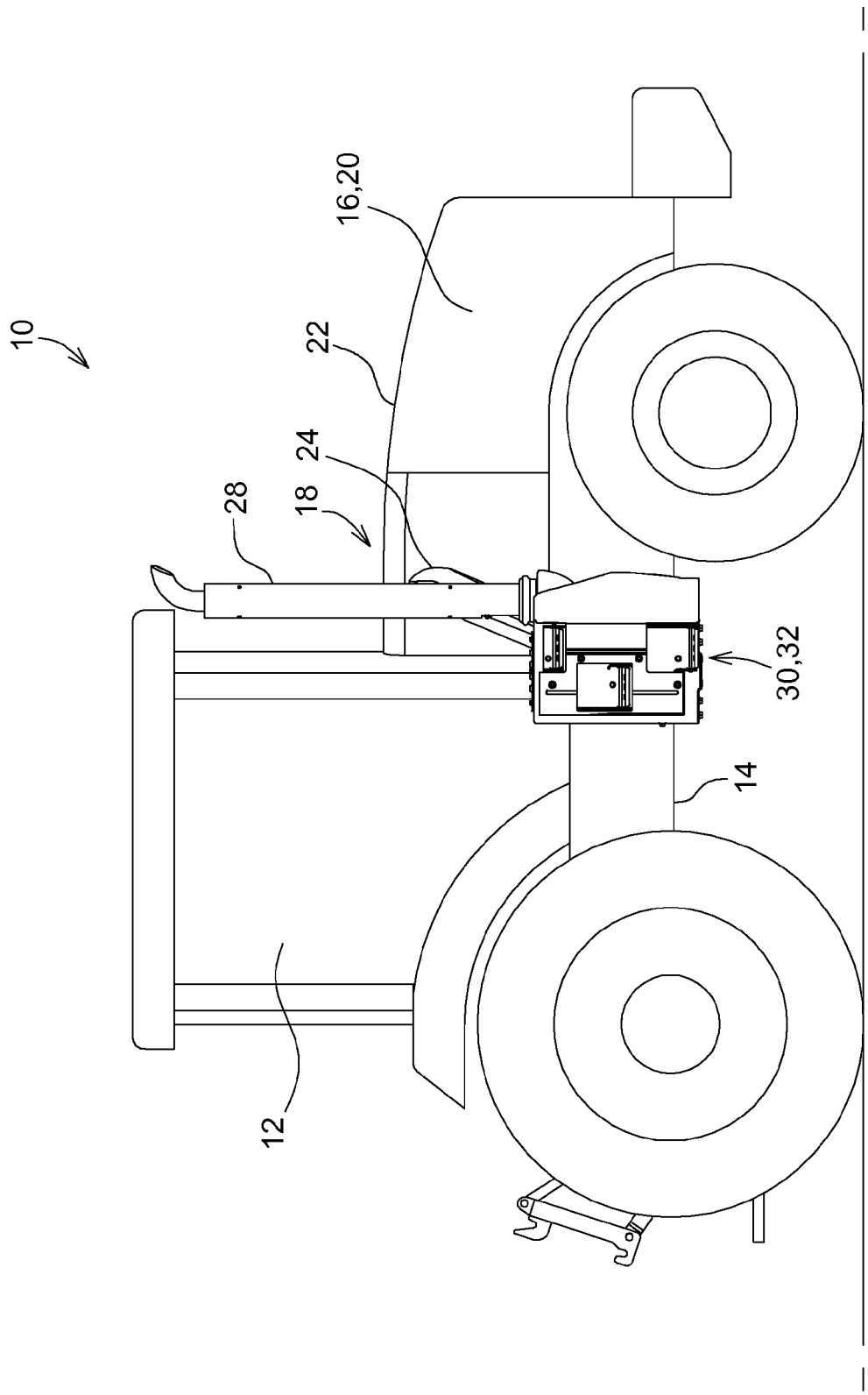
FIG. 1 is a side view of an agricultural work vehicle with an enclosure for a component of the exhaust gas aftertreatment device embodying the invention.
Figure 2:
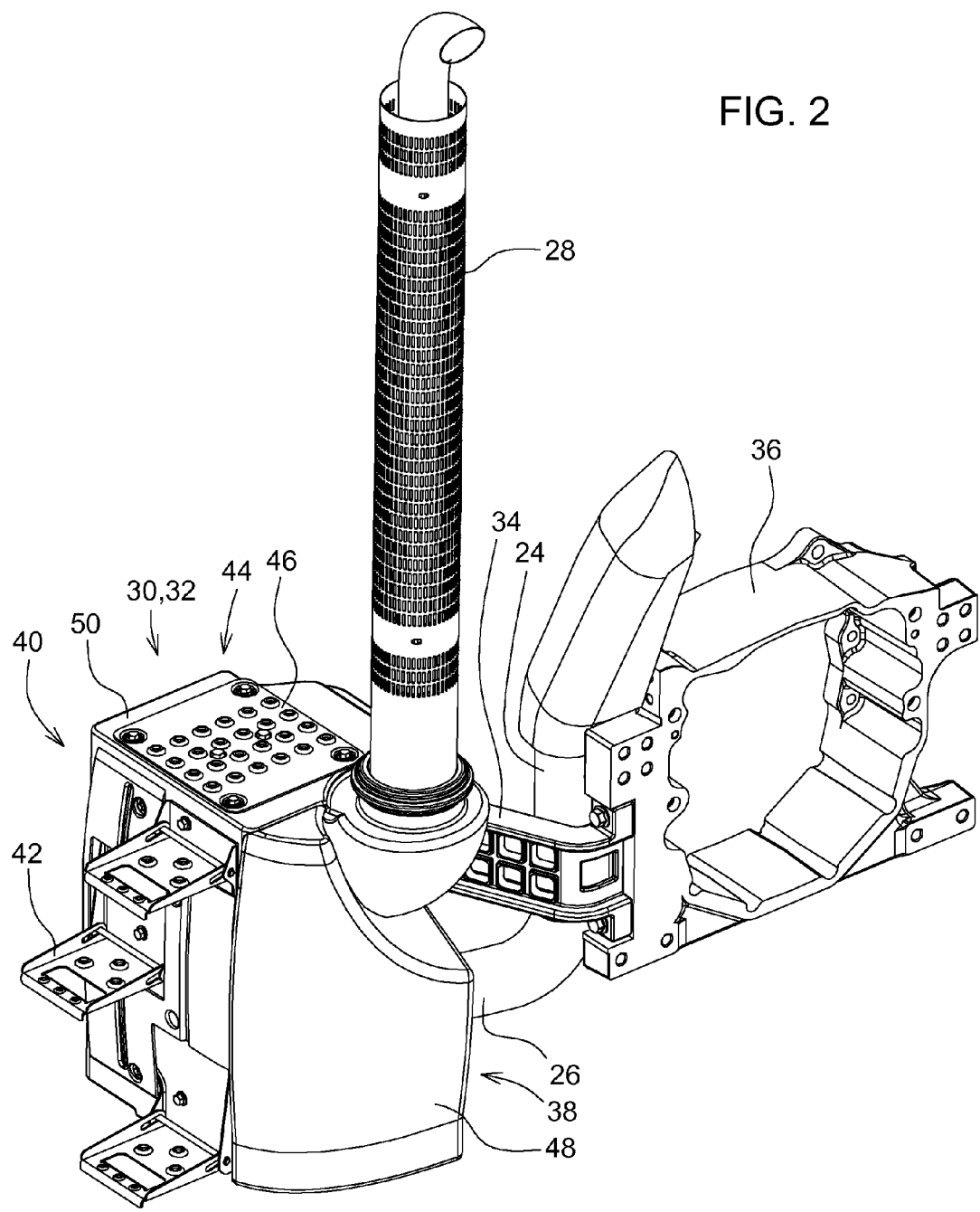
FIG. 2 is an enlarged perspective view of the enclosure of FIG. 1.
Figure 3:
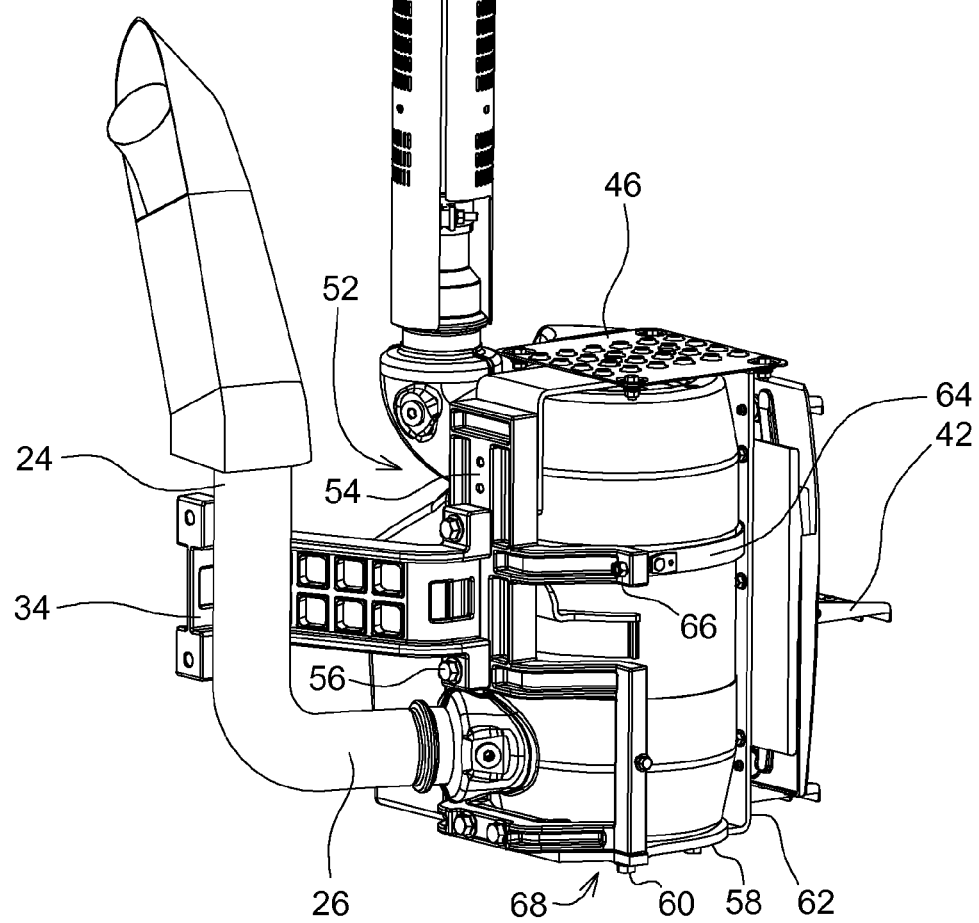
FIG. 3 is another enlarged perspective view of the enclosure of FIG. 1.

At least one example embodiment of the subject matter of this disclosure is understood by referring to FIGS. 1 through 3.

FIG. 1 shows an agricultural work vehicle 10 such as a tractor with a driver's cabin 12, a frame 14, and an only alluded-to combustion engine 16 with an exhaust gas aftertreatment device 18 to discharge and purify the exhaust gas. The combustion engine 16 is situated, in a traditional manner, within an engine space 20. The driver's cabin 12 can be alternatively designed as an open operator platform.

In FIG. 1, one can see that, from the right side of the engine space 20 covered by a hood 22, an exhaust gas tube element 24 exits downward. As is described below, with the aid of FIGS. 2-3, the exhaust gas tube element 24 on its lower end 26 is introduced into an access facility 30, designed as an enclosure 32, for the driver's cabin 12. There is a component 34 of the exhaust gas aftertreatment device 18, for example, an SCR catalyst, in the enclosure 32; the lower end 26 of the exhaust gas tube element 24, in an interconnecting manner, discharges into the component. With the aid of FIG. 1, one can also see that the exhaust gas aftertreatment device 18 exits vertically upward, in the form of an exhaust gas tube element 28, on a front upper end of the enclosure 32.

FIG. 2 shows a detailed view of the access facility 30, which forms the enclosure 32 for a component of the exhaust aftertreatment device 18. The enclosure 32 is held via a supporting arm 34 on a frame structure element 36 of the tractor. As is described here, the frame structure element 36 is a gear unit flange. Alternatively, the frame structure element 36 is formed by the engine block or the supporting frame of the tractor. The supporting arm 34 can be swung in the shape of an S, so that, viewed from the fastening on the frame structure element 36 in the travelling direction of the tractor, it swivels backwards. The supporting arm 34 connects the frame structure element 36 with the interior 38 of the enclosure 32.

The enclosure 32 for a component of the exhaust gas aftertreatment device 18 simultaneously forms an access facility 30 for the driver's cabin 12. To this end, several steps 42 are placed on the outside 40, turned away from the frame structure element 36. As shown here, three steps 42 can be provided, and the steps 42 can also be folded relative to the body of the enclosure 32. A step 46, which corresponds, in its function, to that of the steps 42, is located on an upper side 44 of the enclosure.

One can also see in FIG. 2 that the enclosure 32 comprises a front housing part 48 and a rear housing part 50, and in FIG. 3, in which the rear housing part 50 is not depicted, one can see that the enclosure 32 comprises an inner supporting structure 52. The housing parts 48, 50 are held by the supporting structure 52 and can be made as plastic parts.

The supporting structure 52, in turn, comprises an interior holding element 54, which is connected to the supporting arm 34 by means of a screw connection 56 so that the enclosure 32 is supported on the supporting arm 34 via the holding element 54. The holding element 54 can be shaped as a casting. The holding element 54 forms an expansion 68, directed in the circumferential direction of the component of the exhaust aftertreatment device 18, in its lower area. This is used to hold the component, in its lower area, in a lateral direction. On its holding element 54, a bottom plate 58, serving as a contact surface for the component of the exhaust gas aftertreatment device 18, is fastened by means of a screw connection 60. Thus, a back side and the bottom area of the component of the exhaust gas aftertreatment device 18 are surrounded by the holding element 54 and the bottom plate 58. Proceeding from the holding element 54 and the bottom plate 58, a front side and the upper side of the component of the exhaust aftertreatment device 18 are surrounded by a metal part 62, which engages on the one hand on the bottom plate 58, and on the other hand on the holding element 54. Screw connections can hereby be provided on both sides. The steps 42 and the step 46 are fastened on the sheet metal part 62 in turn.

To hold the component of the exhaust gas aftertreatment device 18 in the enclosure 32 or on the holding element 54, a sheet metal band 64 circumferentially surrounding the component in is provided, which is fastened on the holding element 54 by means of a screw connection 66 and preferably surrounds the component somewhat above half the height of the component.

LIST OF REFERENCE SYMBOLS

10 Work vehicle
12 Combustion engine
14 Frame
16 Driver's cabin
18 Exhaust gas aftertreatment device
20 Engine space
22 Hood
24 Exhaust gas tube element
26 Lower end
28 Exhaust gas tube element
30 Access facility
32 Enclosure
34 Supporting arm
36 Frame structure element
38 Interior
40 Outside
42 Steps
44 Upper side
46 Sheet plate step
48 Housing part
50 Housing part
52 Supporting structure
54 Holding element
56 Screw connection
58 Bottom plate
60 Screw connection
62 Sheet plate part
64 Sheet plate band
66 Screw connection
68 Expansion While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. An agricultural work vehicle, comprising:
   a combustion engine to drive the work vehicle;
   an exhaust after-treatment device for discharging and after-treatment of the exhaust gas;
   a driver's cabin for an operator to drive and operate the work vehicle; and
   an access facility to access the driver's cabin, wherein the access facility forms an enclosure of a component of the exhaust gas aftertreatment device.

2. The agricultural work vehicle of claim 1, wherein:
   the access facility has at least one step to access the driver's cabin.

3. The agricultural work vehicle of claim 2, wherein:
   the at least one step can move between a folded-in and a folded-out position.

4. The agricultural work vehicle of claim 1, wherein:
   the component of the exhaust gas aftertreatment device is a NOx-reducing catalyst.

5. The agricultural work vehicle of claim 1, wherein:
   the component of the exhaust gas aftertreatment device is supported, at least indirectly, above the access facility on a frame structure element of the work vehicle.

6. The agricultural work vehicle of claim 1, wherein:
   the access facility is supported, via a holding arm, on a frame structure element of the work vehicle.

7. The agricultural work vehicle of claim 6, wherein:
   the holding arm is a casting.

8. An agricultural work vehicle comprising:
   a combustion engine to drive the work vehicle;
   an exhaust after-treatment device for discharging and after-treatment of the exhaust gas;
   a driver's cabin for an operator to drive and operate the work vehicle;
   an access facility to access the driver's cabin, the access facility forming an enclosure of a component of the exhaust gas aftertreatment device; and
   a pivotable arm member supporting the access facility on a frame structure element of the work vehicle.

9. The agricultural work vehicle of claim 8, wherein:
   the access facility has at least one step to access the driver's cabin.

10. The agricultural work vehicle of claim 9, wherein:
    the at least one step can move between a folded-in and a folded-out position.

11. The agricultural work vehicle of claim 8, wherein:
    the component of the exhaust gas aftertreatment device is a NOx-reducing catalyst.

12. The agricultural work vehicle of claim 8, wherein:
the component of the exhaust gas aftertreatment device is supported, at least indirectly, above the access facility on a frame structure element of the work vehicle.

13. The agricultural work vehicle of claim 8, wherein:
the pivotable arm member is a casting.

14. An agricultural work vehicle comprising:
a combustion engine to drive the work vehicle;
an exhaust after-treatment device operable to treat exhaust gas produced by the combustion engine; and
an access facility to access a driver's cabin of the work vehicle, the access facility supporting at least a portion of the exhaust after-treatment device.

15. The agricultural work vehicle of claim 14, wherein the access facility further comprises a holding member coupled to a frame structure element of the work vehicle.

16. The agricultural work vehicle of claim 15, wherein the exhaust after-treatment device is seated on a plate coupled to the holding member.

17. The agricultural work vehicle of claim 15, wherein the holding member is coupled to the frame structure by a pivotable holding arm.

18. The agricultural work vehicle of claim 15, wherein the access facility has a step to access the driver's cabin.

\* \* \* \* \*